(No Model.)
J. PLENTY.
PLOW.
No. 562,485. Patented June 23, 1896.
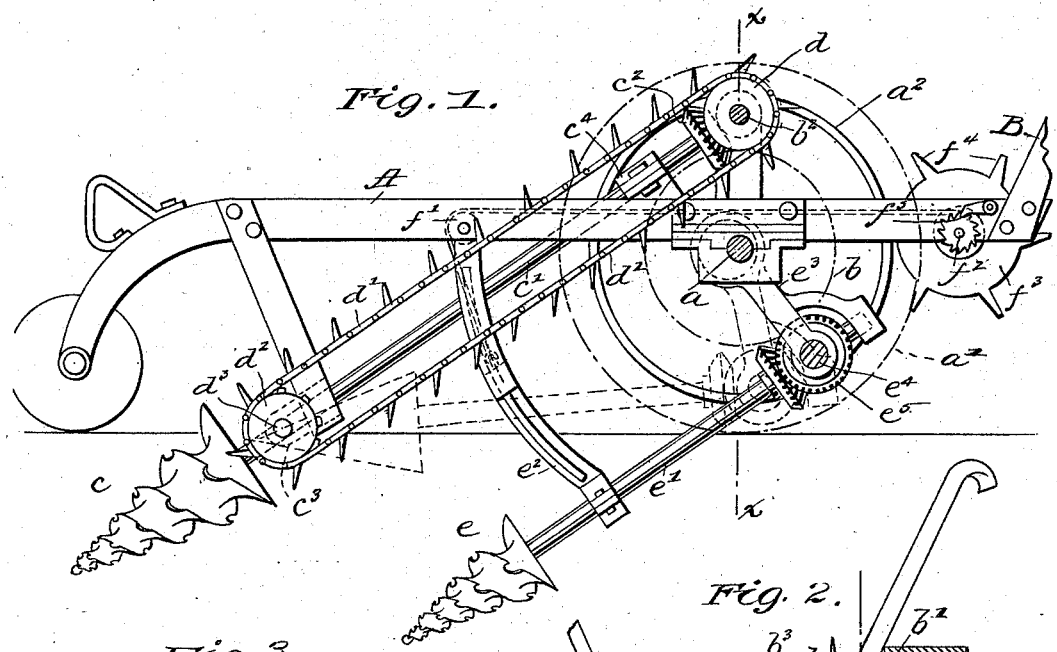
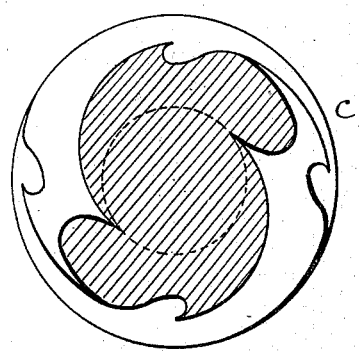
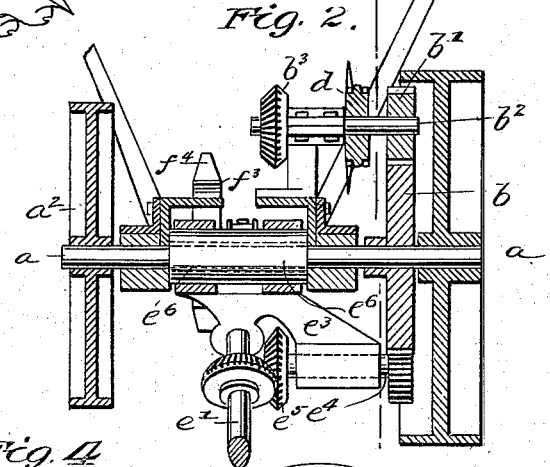
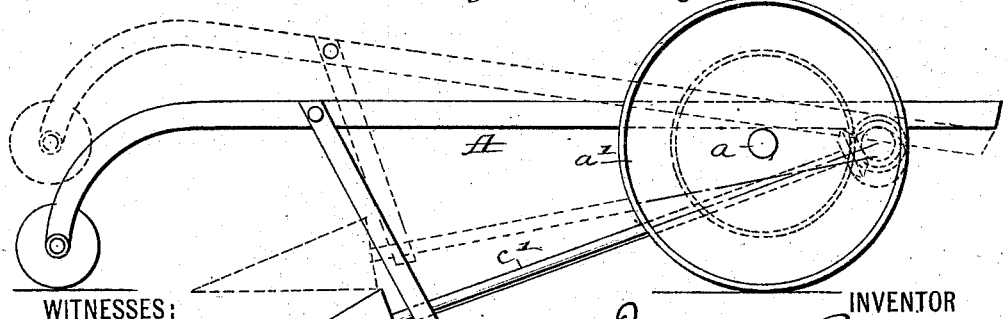
WITNESSES:
Frank D. Ober
John Kraeger
INVENTOR
Josephus Plenty
BY
Wm A Rosenbaum
ATTORNEY

UNITED STATES PATENT OFFICE.

JOSEPHUS PLENTY, OF JERSEY CITY, NEW JERSEY.

PLOW.

SPECIFICATION forming part of Letters Patent No. 562,485, dated June 23, 1896.

Application filed September 17, 1895. Serial No. 562,778. (No model.)

*To all whom it may concern:*

Be it known that I, JOSEPHUS PLENTY, a citizen of the United States, residing at Jersey City, in the county of Hudson and State of New Jersey, have invented certain new and useful Improvements in Plows, of which the following is a full, clear, and exact description.

This invention relates to plows of that class in which the share or point is a rotary screw. In plows of this character heretofore devised, the screw had the general shape of a cone, being of greatest diameter at its base, and the difficulty which has been encountered and in fact the prime reason why such plows are not a success is the fact that the screw cannot be started into the ground without first making an excavation for it.

The object of my invention is to construct a screw plow share or point which shall be capable of making its own way into the ground and thereafter breaking up the soil without packing it at the bottom of the furrow.

The invention also has other objects, all of which will appear in the following description.

The invention consists of the details of construction hereinafter described and claimed.

Referring to the accompanying drawings, Figure 1 is a side elevation of my improved plow. Fig. 2 is a front elevation of the same with the front portion of the plow cut off along line $x$ $x$ of Fig. 1. Fig. 3 is a cross-section of the plowshare, and Fig. 4 is a conventional view of the plow in side elevation.

A represents the plow-beam, and B the handles. The plow-beam is preferably constructed of angle-iron. Near the rear end of the beam an axle $a$ is mounted in suitable boxes. To this is secured rigidly a traction-wheel $a'$, adapted to run on the unplowed ground, and a second wheel $a^2$, either loose or tight on the axle and adapted to run on the plowed ground. Upon the axle is fixed a gear-wheel $b$, with which engages a pinion $b'$ on the end of a counter-shaft $b^2$, mounted in a suitable frame attached to the plow-beam. This counter-shaft also carries a bevel-pinion $b^3$, that engages with another bevel-pinion upon the rear end of a shaft $c'$. This shaft preferably extends through an opening along the middle of the plow-beam and in a downwardly and forwardly direction. At its forward end it supports a screw-plowshare $c^2$. The shaft is suitably mounted and supported in boxes $c^3$ and $c^4$. The screw-share is conical in shape and is formed of two or more threads or helices. It has a regular boring-point that helps it through the earth, and its helices are notched at intervals to form teeth, thus creating a kind of spiral circular saw extending from the base of the screw throughout its length. The teeth are undercut on one side to increase the cutting power, as illustrated in Fig. 3. The counter-shaft $b^2$ also carries a sprocket-wheel $d$, over which passes an endless cutting-chain $d'$. This chain leads to and over another sprocket-wheel $d^2$, mounted upon a stud $d^3$, and in a vertical plane tangent to the last thread of the screw and close to the screw. When the screw is at its normal depth in the earth, this cutting-chain acts as a colter to cleave a straight wall on the landside.

In some soils it is desirable to use in addition to the regular screw-share a subsoil-plow, and I provide for utilizing one of the same general construction as the main share. This is shown at $e$. The screw will be made slightly smaller than the main screw $c$, and it will be driven by the same gear-wheel $b$ that drives the main screw. Its shaft is represented by $e'$ and it is mounted in the end of a vertical adjustable arm $e^2$. The rear end of the shaft has its bearing in a frame $e^3$, depending from the axle, which frame supports a counter-shaft $e^4$, carrying a bevel-pinion $e^5$, engaging with a bevel-pinion on the shaft $e'$. This counter-shaft also carries a spur-pinion that engages with gear-wheel $b$. The frame $e^3$ is mounted eccentrically upon the axle, that is to say, the axle carries eccentric disks or cylinders $e^6$, which are surrounded by straps or boxes on the frame $e^3$. The screw with its shaft and the frame $e^3$ are adapted to swing vertically, and for moving them a chain is provided. This is fastened to the arm $e^2$ and thence leads over a pulley $f'$ on the beam, thence rearward to a drum on a stud $f^2$. To the drum is attached a wheel $f^3$, with arms $f^4$, by which the plowman may rotate the drum either with his foot or hand. A pawl and ratchet $f^5$ is arranged to hold the screw at any elevation. When the screw is at its lowest position, the spur-pinion is in engagement with the wheel $b$, but as it is lifted the pinion runs out of engagement by reason of the eccentric mounting. When not required for use, the subsoil-screw may be lifted to the position shown in dotted lines.

Upon reference to Fig. 4, the utility of the notches or teeth in the screw will become obvious. The dotted lines indicate the position of the screw before it enters the ground. It will be seen that the side of the screw rests squarely upon the surface, so that with the first rotary movement the teeth will bite into the surface of the ground and the threads, then following, will naturally work the screw into the ground to its normal depth. The screw is rotated, of course, by the motion of the traction-wheels, communicated through the gearing, and as soon as the point of the screw is run into the ground the earth will be broken up and conveyed to the rear of the screw, where a moldboard may be located, if desired, to shape the furrow. The colter working in the meanwhile defines the line of the furrow, so that the plow may be directed properly in cutting the next furrow.

No particular location of the notches in the helix of the screw is essential. They may occur at regular or irregular intervals, but the best results may be obtained by arranging them in longitudinal rows, as shown.

Having thus described my invention, I claim—

1. In a plow, a rotary screw-share having a boring-point and the thread or helix of which is notched to form teeth, said teeth cutting in the direction of the thread, for the purpose set forth.

2. In a plow, a rotary screw-share, having a boring-point and the thread or helix of which is notched forming teeth, one side of each notch being undercut for the purpose set forth.

In testimony whereof I subscribe my signature in presence of two witnesses.

JOSEPHUS PLENTY.

Witnesses:
 FRANK S. OBER,
 JOHN KRAEGER.